United States Patent [19]

Weston et al.

[11] Patent Number: 5,364,438
[45] Date of Patent: Nov. 15, 1994

[54] FLUID UREA-CONTAINING FERTILIZER

[75] Inventors: Charles W. Weston, Prairieville; Lawrence A. Peacock, New Orleans; Willis L. Thornsberry, Jr., Gretna, all of La.

[73] Assignee: Freeport-McMoRan Resource Partners, Limited Partnership, New Orleans, La.

[21] Appl. No.: 151,280

[22] Filed: Nov. 12, 1993

[51] Int. Cl.$^5$ ................................................ C05C 9/00
[52] U.S. Cl. ............................................. 71/29; 71/30; 71/902; 71/64.1
[58] Field of Search ...................... 71/29, 30, 902, 64.1

[56] References Cited

U.S. PATENT DOCUMENTS

| | | | |
|---|---|---|---|
| 4,517,003 | 5/1985 | Kolc et al. | 71/28 |
| 4,517,004 | 5/1985 | Swerdloff et al. | 71/28 |
| 4,530,714 | 7/1985 | Kolc et al. | 71/28 |
| 4,932,992 | 6/1990 | Radel | 71/29 |
| 4,954,156 | 9/1990 | Gautney et al. | 71/28 |
| 5,024,689 | 6/1991 | Sutton et al. | 71/29 |

OTHER PUBLICATIONS

Clay et al., Soil Sci. Soc. Am. J. 54, pp. 263–266, 1990

"Ammonia Volatilization from Urea . . . Hydrolysis Inhibitors".

*Primary Examiner*—Ferris Lander
*Attorney, Agent, or Firm*—Fisher, Christen & Sabol

[57] ABSTRACT

An improved fluid urea-containing fertilizer composition is disclosed; the composition is essentially comprised of an aqueous solution of urea, ammonium nitrate, N-(n-butyl)thiophosphoric triamide (NBPT), dicyandiamide (DCD), and may optionally also contain a clay as a suspending agent. The fluid fertilizer composition can be applied to a field crop in a single application and will nevertheless supply sufficient nitrogen to the plants throughout their growth and maturing cycles. As a result, the improved composition increases the nitrogen uptake efficiency of plants, enhances crop yields, and minimizes the loss of nitrogen from the soil.

The NBPT is incorporated into the fluid fertilizer composition by blending a concentrated solution of N-(n-butyl)thiophosphoric triamide in a solvent selected from the group consisting of liquid amides such as an N-alkyl pyrrolidone directly with an aqueous solution of urea and ammonium nitrate, optionally also containing a suspending agent and commonly referred to in the fertilizer trade as UAN; the DCD may be added to the UAN fluid as a solid, a suspension, or in dissolved form along with the NBPT.

23 Claims, No Drawings

FLUID UREA-CONTAINING FERTILIZER

FIELD OF THE INVENTION

This invention relates to an improved fluid urea-containing fertilizer composition. More specifically, this invention discloses a fluid fertilizer composition comprising an aqueous solution of urea, ammonium nitrate, N-(n-butyl)thiophosphoric triamide (NBPT), dicyandiamide (DCD), and may optionally also contain a clay as a suspending agent. The fluid fertilizer composition can be applied to a field crop in a single application and will nevertheless supply sufficient nitrogen to the plants throughout their growth and maturing cycles. As a result, the improved composition increases the nitrogen uptake efficiency of plants, enhances crop yields, and minimizes the loss of nitrogen from the soil. The NBPT may be incorporated into the fluid fertilizer composition by blending a concentrated solution of N-(n-butyl)-thiophosphoric triamide in a liquid amide solvent for said NBPT such as an N-alkyl pyrrolidone directly with an aqueous solution of urea and ammonium nitrate, optionally also containing a suspending agent and commonly referred to in the fertilizer trade as UAN; the DCD may be added to the UAN fluid as a solid, a suspension, or in dissolved form along with the NBPT.

BACKGROUND OF THE INVENTION

Nitrogen is an important plant nutrient. In addition to phosphorous, potassium, and other nutrients, nitrogen is needed to support the growth and development of plant life. Some plants, such as legumes, through a symbiotic relationship with Rhizobium bacteria take up elemental nitrogen from the atmosphere and fix this nitrogen into the soil. However, most plants grown to produce human and animal food require the use of nitrogen fertilizer in order to sustain their agricultural production.

The most widely used and agriculturally important high-analysis nitrogen fertilizer is urea, $CO(NH_2)_2$. While most of the urea currently produced is used as a fertilizer in its granular form, urea-based fluid fertilizers are also well known. As used herein, the term "fluid fertilizers" encompasses liquid fertilizers, i.e. aqueous solutions of fertilizers, and suspension fertilizers, i.e. fertilizer compositions which in addition to water and water-soluble components also contain insoluble components kept in suspension by a suspending agent, such as clay. Suspension fertilizers are excellent carriers for pesticides and micronutrients.

The most commonly known urea-based liquid fertilizer is an aqueous solution of urea and ammonium nitrate, referred to in the fertilizer trade as a UAN solution. The corresponding urea-based suspension fertilizer is an aqueous solution of urea and ammonium nitrate also containing a suspending agent, such as clay. These fluid fertilizers are used on a variety of crops, such as corn, wheat and rice. When applied to moist soil, the urea content of the fluid fertilizer becomes a source of ammonia as a result of hydrolysis catalyzed by urease, an enzyme produced by numerous fungi and bacteria. The reaction may be written as follows:

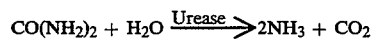

$$CO(NH_2)_2 + H_2O \xrightarrow{Urease} 2NH_3 + CO_2$$

The ammonia formed as shown above undergoes very rapid hydrolysis to form ammonium ions in accordance with the following equilibrium:

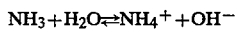

$$NH_3 + H_2O \rightleftharpoons NH_4^+ + OH^-$$

In most soils, the ammonium formed through hydrolysis as shown above, as well as the ammonium originally supplied as ammonium nitrate are readily converted to nitrate via a sequence of bacterial oxidation reactions; the overall oxidation reaction may be written as follows:

$$NH_4^+ + 2O_2 \rightarrow NO_3^- + H_2O + 2H^+$$

and is commonly referred to as "nitrification".

Both, ammonium nitrogen derived through the hydrolysis of urea or supplied as an ammonium compound as well as nitrate nitrogen resulting from the oxidation of ammonia or supplied as a nitrate compound may be assimilated directly by the plant. Thus, the urease-catalyzed hydrolysis of urea and the bacterial oxidation of ammonium are two key steps in the vital transformation of urea nitrogen first into ammonium nitrogen and then into nitrate nitrogen, both of which function in soils as nitrogen nutrients.

The major problems associated with the use of urea-containing fluid fertilizers, such as UAN, as a source of nitrogen nutrient to support the growth of crop plants relate to the fact that the time frame for the catalytic hydrolysis of urea to ammonia and for the subsequent nitrification of ammonium does not coincide with the ongoing demand for nitrogen by the root system of the plants. More specifically, the catalytic hydrolysis of urea and the subsequent nitrification of the ammonium ions proceed relatively rapidly, i.e. within 2 to 20 days, as compared to the 50 to 200 day growing seasons for typical crop plants. Since both ammonia and nitrate can be lost from the soil by various mechanisms before being assimilated by the plant, the premature conversion of urea into ammonium and nitrate nitrogen contributes to the low (40%) efficiency with which crop plants utilize fertilizer nitrogen. Examples of mechanisms by which nitrogen can be lost from the soil include loss of ammonia through volatilization to the atmosphere and loss of nitrate through leaching to the subsoil by rainwater and/or through denitrification, i.e. bacterial conversion of nitrate to elemental nitrogen. Another drawback related to rapid hydrolysis of urea is the potential for excessive accumulation of ammonia in the soil shortly after seeding which may result in damage to germinating seedlings and young plants.

Prior art offers two approaches to make nutrient nitrogen derived from fluid urea-containing fertilizers available to root systems of plants throughout their growing season: (1) multiple fertilizer applications, and (2) the incorporation of urease inhibitors or nitrification inhibitors into the fertilizer formulation. There are certain limitations and drawbacks associated with each of these approaches advocated by prior art.

The first approach involves the use of multiple fertilizer applications during the course of a crop growth season. Such multiple fertilizer applications can provide adequate nitrogen to meet the demands the growing plants, but they do so at the expense of higher fertilizer costs, higher fertilizer application costs, and of an adverse environmental impact associated with the loss of nitrate through leaching to the subsoil.

The second approach toward improving the availability of nitrogen to the root system of plants over an extended period of time entails the incorporation of a urease inhibitor or of a nitrification inhibitor into urea-containing fertilizers. Urease inhibitors are compounds capable of inhibiting the catalytic activity of the urease enzyme upon urea in moist soil. Among the most effective urease inhibitors are the phosphoric triamide compounds disclosed in U.S. Pat. No. 4,530,714. An example of an effective urease inhibitor disclosed in the '714 patent is N-(n-butyl)thiophosphoric triamide, which will be referred to herein as NBPT. When incorporated into a fluid urea-containing fertilizer, NBPT reduces the rate at which urea is hydrolyzed in the soil to ammonia. The benefits realized as a result of the delayed urea hydrolysis include the following: (1) nutrient nitrogen is available to the plant over a longer period of time, (2) excessive build up of ammonia in the soil following the application of the urea-containing fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While NBPT does not directly influence the rate of ammonium nitrification, it does control the levels of ammonium which are subject to the nitrification process and thereby indirectly controls the levels of nitrate nitrogen generated in the soil.

NBPT has not been commercially used heretofore as an additive in fluid urea-containing fertilizers, presumably because of the lack of a suitable method for the preparation of such fluid fertilizers stemming from certain physical and chemical characteristics of industrial grade NBPT which render this material difficult to handle. Industrial grade NBPT is a waxy, sticky, heat-sensitive and water-sensitive material. Consequently, the material is susceptible to decomposition during storage and methodology for metering NBPT into production equipment has been heretofore unavailable.

The availability of nitrate nitrogen to plants over an extended period of time can also be enhanced through the incorporation of nitrification inhibitors into urea-containing fertilizers. Nitrification inhibitors are compounds capable of inhibiting the bacterial oxidation of ammonium to nitrate in the soil. Among the most effective nitrification inhibitors is dicyandiamide, also referred to as DCD. A fluid urea-containing fertilizer formulation containing DCD is disclosed in U.S. Pat. No. 5,024,689. While DCD does not affect the rate at which urea is hydrolyzed to ammonia in the soil, it significantly reduces the rate at which ammonium is oxidized to nitrate. The benefits realized as a result of the delayed nitrification process include the following: (1) nutrient nitrogen is available to the plant over a longer period of time than is the case in the absence of DCD, (2) the potential for loss of nitrate nitrogen through denitrification and/or leaching is reduced, (3) plant uptake of nitrogen is increased, and (4) crop yields are increased. However, the improvement in the performance of fluid fertilizers containing urea and DCD which can be attributed to the incorporation of DCD in these formulations is believed to be severely limited by the susceptibility of these formulations to urease-catalyzed hydrolysis following application of the fertilizer to the soil. This may result in relatively high ammonia losses through volatilization and in ammonia damage to seedlings and young plants.

In addition to the foregoing, U. S. Pat. Nos. 4,517,003; 4,517,004; 4,932,992; and 4,954,156 make reference to various compounds which are capable of inhibiting both the urease-catalyzed hydrolysis of urea and the oxidation of ammonium to nitrogen. None of these, however, have found commercial acceptance in the fertilizer industry as additives capable of improving the performance of urea-containing fluid fertilizers in terms of their ability to enhance crop yields.

Accordingly, it is an object of this invention to provide a fluid urea-containing fertilizer formulation which offers an effective alternative to the high amounts of urea-containing nitrogen fertilizer that are currently used to assure that crop yields are not limited by the availability of nitrogen as a plant nutrient.

It is a further object of this invention to increase nitrogen uptake efficiency of urea-containing fluid fertilizers.

It is another object of this invention to provide a urea-based fluid fertilizer formulation the performance of which is characterized by relatively low ammonia volatilization losses, low losses of nitrate nitrogen through denitrification and/or leaching, and substantially enhanced crop yields.

It is still another object of this invention to provide a method for the production of the urea-containing fluid fertilizer formulations disclosed hereinbelow.

SUMMARY OF THE INVENTION

The improved fluid fertilizer composition of this invention is comprised primarily of an aqueous urea-ammonium nitrate solution (UAN), N-(n-butyl)thiophosphoric triamide (NBPT), and dicyandiamide (DCD). The urea content of the composition of this invention is between about 24% and about 32% by weight, the ammonium nitrate content of the composition is between about 34% and about 42% by weight, the NBPT content of the composition is between about 0.01% and about 0.4% by weight, and the DCD accounts for up to about 2.0% by weight of the composition. The balance of the composition consists primarily of water; an N-alkyl pyrrolidone may also be present in small quantities. The composition may optionally also contain a suspending agent, such as clay, as well as other additives, such as a herbicide, a dye, an NBPT stabilizer, or a micronutrient.

The fluid fertilizer composition of this invention can be applied to a field crop in a single surface application and will nevertheless supply sufficient nitrogen to the plants throughout their growth and maturing cycles. The new improved composition increases the nitrogen uptake by plants, enhances crop yields, and minimizes the loss of both ammonium nitrogen and nitrate nitrogen from the soil.

The NBPT may be incorporated into the fluid fertilizer composition of this invention by blending a concentrated solution of NBPT in an N-alkyl pyrrolidone, such as N-methyl pyrrolidone, with an aqueous urea-ammonium nitrate (UAN) solution or suspension. The DCD may be added to the UAN as a solid, a suspension, or in dissolved form along with the NBPT.

DETAILED DESCRIPTION OF THE INVENTION

Applicants' commonly assigned copending U.S. Patent Application titled "Granular Urea-Containing Fertilizer" filed concurrently herewith discloses an improved homogenous granular urea-based fertilizer composition containing a specific urease inhibitor and a specific nitrification inhibitor, and teaches its usage and production methods.

In contrast, the present invention provides an improved fluid urea-ammonium nitrate (UAN) fertilizer composition containing two additives, namely a urease inhibitor which stabilizes the urea against hydrolysis to ammonium and a nitrification inhibitor which stabilizes the ammonium against oxidation to the nitrate form. Specifically, the improved fluid fertilizer composition of this invention is comprised primarily of an aqueous solution of urea, ammonium nitrate, N-(n-butyl)thiophosphoric triamide (NBPT), and dicyandiamide (DCD).

NBPT is the most effective known urease inhibitor and has the following chemical formula:

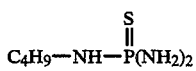

It should be understood that the term NBPT as used throughout this specification refers not only to N-(n-butyl)thiophosphoric triamide in its pure form, but also to industrial grades of the material which may contain up to 50% impurities, depending on the method of synthesis and purification scheme(s), if any, employed in the production of the NBPT.

DCD is among the most effective known nitrification inhibitors, or ammonia stabilizers, and has the following chemical formula:

The urea content of the composition of this invention is between about 24% and about 32% by weight, and preferably between about 26% and about 32% by weight; the ammonium nitrate content of the composition is between about 34% and about 42% by weight, and preferably between about 36% and about 42% by weight; the NBPT content of the composition is between about 0.01% and about 0.4% by weight, and preferably between about 0.02% and about 0.3% by weight; and the DCD accounts for about 0.01% to about 2.0% by weight of the composition, and preferably accounts for between about 0.03% and about 1.5% by weight of the composition. The balance of the composition consists primarily of water. A solvent for the NBPT, selected from the group consisting of liquid amides such as an N-alkyl 2-pyrrolidone may also be present in small quantities. The composition may optionally also contain a suspending agent, such as clay, as well as other additives, such as a herbicide, a dye, an NBPT stabilizer, or a micronutrient.

Those skilled in the art would expect that the incorporation of both NBPT and DCD into UAN could impair the effectiveness of the UAN as a fertilizer. Since NBPT is the most effective agent known to inhibit the urease-catalyzed conversion of urea to ammonia, it would have been expected that the additional incorporation of DCD into UAN could result in a formulation which does not provide adequate nitrate nitrogen to support vigorous plant growth during the maturing cycle of the plant. The inventors surprisingly found that the combined incorporation of these two additives into UAN results in a fertilizer composition which promotes exceptionally high crop yields.

The UAN-based fertilizer composition of this invention can be used in all agricultural applications in which UAN is currently used. These applications include a very wide range of crop and turf species, tillage systems, and fertilizer placement methods. The fertilizer composition of this invention can be applied to a field crop, such as corn or wheat, in a single surface application and will nevertheless supply sufficient nitrogen to the plants throughout their growth and maturing cycles. Moreover, the fluid fertilizer composition of this invention supplies nitrogen nutrient to crop plants with greater efficiency than any previously known fluid fertilizer composition. The new improved composition increases the nitrogen uptake by plants, enhances crop yields, and minimizes the loss of both ammonium nitrogen and nitrate nitrogen from the soil.

The rate at which the fertilizer composition of this invention is applied to the soil may be identical to the rate at which UAN is currently used for a given application, with the expectation of a higher crop yield in the case of the composition of this invention. Alternately, the composition of this invention may be applied to the soil at lower rates than is the case for UAN and still provide comparable crop yields, but with a much lower potential for nitrogen loss to the environment. It is of interest to illustrate the quantities of NBPT and DCD introduced into the soil when a given composition of this invention is applied as a fertilizer. For example, assuming that the composition is applied to the soil at a rate of 200 pounds per acre and that it contains 0.05% NBPT and 0.5% DCD, it can be readily calculated that the rates of NBPT and DCD application are 0.1 and 1.0 pounds per acre, respectively.

The utilization of two specific additives, one to inhibit the urease-catalyzed hydrolysis of urea and the other to inhibit the nitrification of ammonia, in the fertilizer composition of this invention offers an opportunity to tailor the make-up of the composition to match the nitrogen nutrient demand of a given crop/soil/weather scenario. For example, if the soil is characterized by a low pH and/or if rain is anticipated shortly after fertilizer application and the opportunity for ammonia losses through volatilization to the atmosphere is thereby diminished, the level of the NBPT urease inhibitor incorporated into the formulation may be reduced, within the specified range, without also changing the level of the DCD nitrification inhibitor. The relative resistance of the fluid fertilizer composition of this invention to urea hydrolysis and ammonia oxidation is controlled by properly selecting the NBPT to DCD weight ratio of the composition. This ratio should exceed a value of about 0.01, should preferably be between about 0.02 and about 8.0, and should most preferably be between about 0.05 and about 1.0. Fluid fertilizer compositions with NBPT to DCD weight ratios near the higher end of these ranges will exhibit relatively higher resistance to urea hydrolysis than to ammonium oxidation, and vice versa. This independent control over the relative resistance of the composition to urea hydrolysis and ammonia oxidation is unattainable through the methods of prior art and provides unparalleled flexibility in meeting the nutrient demands of various crops under a broad range of soil/weather conditions.

In accordance with the present invention, the NBPT may be incorporated into the fluid fertilizer composition by adding a concentrated solution of NBPT in a liquid amide solvent for the NBPT, such as, an N-alkyl pyrrolidone directly to a UAN fluid with sufficient mixing to assure that the NBPT is homogeneously distributed throughout the fluid fertilizer composition. As already stated, industrial grade NBPT is a waxy and sticky material, and as such it is difficult to handle in conventional industrial metering equipment in order to introduce it into a UAN fluid. Furthermore, NBPT is poorly soluble in water, in aqueous solutions, such as ammonium hydroxide solutions, and in numerous organic solvents, such as toluene, benzene, hexane, dichloromethane, and others. As disclosed in applicants' copending U.S. Patent Application titled "Granular Urea-Containing Fertilizer" however NBPT is exceptionally soluble in solvents selected from the group consisting of liquid amides and N-alkyl 2-pyrrolidones, such as N-methyl 2-pyrrolidone, and concentrated solutions of NBPT in N-alkyl 2-pyrrolidones are relatively stable and can be introduced into UAN using conventional metering pumps.

The N-alkyl 2-pyrrolidones used as NBPT solvents in accordance with this invention belong to the group comprising five-membered heterocyclic organic compounds with one nitrogen atom per ring, with an oxygen atom bonded to a ring carbon atom adjacent to the nitrogen, and with an alkyl group ranging in size from one to six carbon atoms bonded directly to the nitrogen atom. This group of N-alkyl 2-pyrrolidones is similar to that disclosed in applicants' copending U.S. Patent Application titled "Granular Urea-Containing Fertilizer", except for the size range of the alkyl group bonded to the nitrogen atom. Examples of N-alkyl 2-pyrrolidones which can be used as NBPT solvents in practicing this invention include N-methyl 2-pyrrolidone, N-ethyl 2-pyrrolidone, and N-hexyl 2-pyrrolidone. The preferred pyrrolidone used in the practice of this invention is N-methyl 2-pyrrolidone.

The concentrated NBPT solution in N-alkyl 2-pyrrolidone used in producing the fluid UAN-based fertilizer composition of this invention contains between about 30% and about 80% NBPT, and preferably between about 50% and about 75% NBPT. The concentrated NBPT solution may be prepared by dissolving NBPT in a solvent selected from a group of liquid amides such as an N-alkyl 2-pyrrolidone, as will be illustrated in Example 1 hereinbelow, or by incorporating the N-alkyl 2-pyrrolidone into the NBPT production system in order to produce an NBPT solution, rather than recover a waxy NBPT solid. The concentrated NBPT solutions can be managed using conventional liquid storage, transportation, and pumping equipment.

The amount of concentrated NBPT solution added to the UAN fluid in accordance with this invention depends on the desired NBPT content of the fertilizer composition within the ranges specified hereinabove and on the NBPT content of the concentrated NBPT solution, and can be readily calculated by those skilled in the art.

Because of the concentrated nature of the NBPT solution only very limited quantities of the N-alkyl 2-pyrrolidone solvent are introduced into the UAN fluid along with the NBPT. For example, if the NBPT content of the concentrated NBPT solution used to incorporate the NBPT in the fertilizer composition is 70% and the NBPT content of the resulting fertilizer composition is 0.07%, the solvent content of the resulting fertilizer composition is only 0.03%.

In accordance with the present invention, in addition to the NBPT, DCD is also added to the UAN fluid. Several methods are available for the introduction of DCD into UAN. If available as a powder or in granular form, the DCD can be fed into UAN fluid using a conventional solids feeding device. Preferably, however, the DCD is first incorporated into a relatively small quantity of UAN fluid so as to form a slurry of DCD in UAN fluid; this slurry is then blended with the balance of the UAN fluid in the amount needed to provide the desired concentration of DCD within the ranges specified hereinabove. Regardless of the method selected to introduce the DCD into the UAN fluid, sufficient mixing should be provided to facilitate homogenous distribution of the DCD throughout the UAN fluid. The homogeneous distribution of both NBPT and DCD in the fluid fertilizer compositions of this invention enhances the performance of these compositions in terms of their ability to promote plant growth.

The order in which NBPT and DCD are added to the fluid fertilizer in the practice of this invention is flexible: either NBPT or DCD may be introduced first, or both of these components may be added simultaneously. However, in light of the relative instability of NBPT in aqueous solutions, the concentrated solution of NBPT should preferably be introduced into the fluid fertilizer relatively late in production-storage-distribution sequence of the fluid fertilizer, so as to minimize the time span between the addition of the concentrated NBPT solution to the fluid fertilizer and the application of the fertilizer to the soil.

The fluid fertilizer composition of this invention offers a number of advantages over prior art. First and foremost, crop yields attained through the use of the new fertilizer composition exceed crop yields attainable with any other known fluid fertilizer composition. Furthermore, this invention provides unparalleled flexibility in tailoring the composition of the fluid fertilizer formulation to the needs of the crop/soil/weather scenario of a given application. Consequently, the fluid fertilizer composition of this invention facilitates maximum crop yields without overfertilization and associated nitrogen losses.

It should be borne in mind that NBPT and DCD are generally regarded as urease and nitrification inhibitors, respectively. However, when used in accordance with this invention they do not completely inhibit, but merely suppress over an extended period of time (1) the susceptibility of the urea content of the composition of this invention to catalytic hydrolysis by enzymes and (2) the propensity of ammonia, regardless whether originally present in the composition or derived from urea, to promote excessive bacterial growth.

In addition to the foregoing, this invention also provides a simple, convenient and effective method of producing the new fluid fertilizer compositions described hereinabove.

EXAMPLES

Example 1

This example describes the preparation of a concentrated of a solution of NBPT in N-methyl 2-pyrrolidone. 300 grams of N-methyl 2-pyrrolidone were placed in a 1500 ml glass beaker. 700 grams of industrial grade NBPT were slowly added to the N-methyl 2-pyrrolidone over a period of 30 minutes with stirring to assure effective dissolution of the NBPT. The industrial grade NBPT was an unrefined product containing 80% NBPT. Thus, the NBPT solution prepared in this manner contained 56% NBPT. The solution was stored at a temperature of about 70° F. over a period of three months, during which time it was sampled and analyzed on a monthly basis. The NBPT assays of the solution remained virtually unchanged during this period of time. This example illustrates not only the exceptionally high solubility of NBPT in N-alkyl 2-pyrrolidones, but also the long term stability of concentrated NBPT solutions in the solvents belonging to the group of N-alkyl 2-pyrrolidones defined hereinabove.

Example 2

This example illustrates the method of this invention for the incorporation of NBPT into a fluid urea-containing fertilizer composition. As a first step, a 5,000 lb batch of concentrated solution of NBPT was prepared by dissolving 3,500 lbs of industrial grade NBPT in 1,500 lbs of N-methyl 2-pyrrolidone. The industrial grade NBPT contained 80% NBPT. Thus, the concentrated NBPT solution contained 56% NBPT. This concentrated NBPT solution was pumped at a rate equivalent to 2 pounds of NBPT per 1998 pounds of UAN solution into a 50 ton/hour stream of UAN solution containing 30% urea and 40% ammonium nitrate and approximately 10 pounds per ton DCD. Said stream of UAN solution was being transferred from a liquid storage tank into liquid rail cars. Although the retention time of the UAN solution between the point near the liquid storage tank at which the concentrated NBPT solution was injected into the UAN solution and the point at which the solution was discharged into the rail car was only in the order of 40 seconds, the degree of turbulence in the stream of UAN solution assured thorough mixing and homogenous distribution of the concentrated NBPT solution in the UAN solution. A set of rail cars was filled in this manner with a total of about 1400 tons of UAN solution containing about 0.1% NBPT.

Example 3

This example illustrates the method for the production of the improved fluid urea-containing fertilizer composition of this invention. The test was conducted at a UAN storage and rail car loading terminal. The UAN solution stored at this terminal contained 30% urea and 40% ammonium nitrate. A 5,000-pound batch of concentrated NBPT solution was prepared as described in Example 2, hereinabove. Separately, a batch of DCD slurry was prepared by suspending 14,000 pounds of DCD in 14,000 pounds of UAN solution. The concentrated NBPT solution and the DCD slurry were pumped at rates equivalent to 2 pounds of NBPT and 10 pounds of DCD per 1976 pounds of UAN solution into a stream of UAN solution being transferred from a liquid storage tank into liquid rail cars. Although the retention time of the UAN solution between the point at the liquid storage tank at which the DCD slurry and the concentrated NBPT solution were injected into the UAN solution and the point at which the solution was discharged into the rail car was only in the order of 40 seconds, the degree of turbulence in the stream of UAN solution assured thorough mixing and homogenous distribution of the concentrated NBPT solution and of the DCD slurry in the UAN solution. A set of rail cars was filled in this manner with a total of about 1400 tons of UAN solution containing about 0.1% NBPT and about 0.5% DCD, and having an NBPT to DCD weight ratio of about 0.2.

What is claimed is:

1. A fluid fertilizer composition comprising as components an aqueous solution of urea, ammonium nitrate, N-(n-butyl) thiophosphoric triamide, and dicyandiamide, wherein said urea is present in said aqueous solution in an amount between about 24% and about 32% by weight, said ammonium nitrate is present in an amount between about 34% and about 42% by weight, said N-(n-butyl) thiophosphoric triamide is present in an amount between about 0.01% and about 0.4% by weight, and said dicyandiamide is present in an amount of about 0.01% to about 2.0% by weight.

2. A fluid fertilizer composition as claimed in claim 1 wherein said urea is present in said aqueous solution in an amount between about 24% and about 32% by weight, said ammonium nitrate is present in an amount between about 34% and about 42% by weight, said N-(n-butyl)thiophosphoric triamide is present in an amount between about 0.02% and about 0.3% by weight, and said dicyandiamide is present in an amount between about 0.05% and about 1.5% by weight.

3. A fluid fertilizer composition as claimed in claim 1 wherein the weight ratio of said N-(n-butyl)thiophosphoric triamide to said dicyandiamide is above about 0.01.

4. A fluid fertilizer composition as claimed in claim 1 wherein the weight ratio of said N-(n-butyl)thiophosphoric triamide to said dicyandiamide is between about 0.02 and about 8.0.

5. A fluid fertilizer composition as claimed in claim 1 wherein the weight ratio of said N-(n-butyl)thiophosphoric triamide to said dicyandiamide is between about 0.1 and about 1.0.

6. A fluid fertilizer composition as claimed in claim 1 wherein said composition also contains clay as a suspending agent.

7. A fluid fertilizer composition as claimed in claim 1 containing a liquid amide.

8. A fluid fertilizer composition as claimed in claim 1 containing an N-alkyl 2-pyrrolidone wherein said alkyl group contains 1 to 6 carbon atoms.

9. A fluid fertilizer composition as claimed in claim 8 wherein said N-alkyl 2-pyrrolidone is N-methyl 2-pyrrolidone.

10. A fluid fertilizer composition as claimed in claim 8 wherein said N-alkyl 2-pyrrolidone is present in the amount of about 20% to about 70% by weight of said N-(n-butyl)thiophosphoric triamide in said composition.

11. A fluid fertilizer composition as claimed in claim 8 wherein said N-alkyl 2-pyrrolidone is present in the amount of about 25% to about 50% by weight of said N-(n-butyl)thiophosphoric triamide in said composition.

12. A Method of enhancing the growth of plants by applying to the soil a fluid fertilizer composition comprising as components an aqueous solution of urea, ammonium nitrate, N-(n-butyl) thiophosphoric triamide, and dicyandiamide, wherein said urea is present in said aqueous solution in an amount between about 24% and about 32% by weight, said ammonium nitrate is present in an amount between about 34% and about 42% by weight, said N-(n-butyl) thiophosphoric triamide is present in an amount between about 0.01% and about 0.4% by weight, and said dicyandiamide is present in an amount of about 0.01% to about 2.0% by weight.

13. A method of enhancing the growth of plants as claimed in claim 12 wherein said urea is present in said composition in an amount between about 24% and about 32% by weight, said ammonium nitrate is present in said composition in an amount between about 34% and about 42% by weight, said N-(n-butyl)thiophosphoric triamide is present in said composition in an amount between about 0.02% and about 0.3% by weight, and said dicyandiamide is present in said composition in an amount between about 0.03% and about 1.5% by weight.

14. A method of enhancing the growth of plants as claimed in claim 12 wherein the weight ratio of said N-(n-butyl)thiophosphoric triamide to said dicyandiamide in said composition is above about 0.01.

15. A method of enhancing the growth of plants as claimed in claim 12 wherein the weight ratio of said N-(n-butyl)thiophosphoric triamide to said dicyandiamide in said composition is between about 0.02 and about 8.0.

16. A method of enhancing the growth of plants as claimed in claim 12 wherein the weight ratio of said N-(n-butyl)thiophosphoric triamide to said dicyandiamide in said composition is between about 0.1 and about 1.0.

17. A method for producing a fluid fertilizer composition comprising providing an aqueous solution of urea and ammonium nitrate and adding dicyandiamide and a concentrated solution of N-(n-butyl) thiophosphoric triamide in a liquid amide solvent for said N-(n-butyl) thiophosphoric triamide, wherein said urea is present in said composition in an amount between about 24% and about 32% by weight, said ammonium nitrate is present in said composition in an amount between about 34% and about 42% by weight, said N-(n-butyl) thiophosphoric triamide is present in said composition in an amount between about 0.01% and about 0.4% by weight, and said dicyandiamide is present in said composition in an amount of about 0.01% to about 2.0% by weight.

18. Method as claimed in claim 17 wherein said liquid amide solvent is N-alkyl 2-pyrrolidone wherein said alkyl group contains 1 to 6 carbon atoms.

19. Method as claimed in claim 17 wherein said liquid amide is N-methyl 2-pyrrolidone.

20. A method as claimed in claim 19 wherein urea is present in said composition in an amount between about 24% and about 32% by weight, ammonium nitrate is present in said composition in an amount ranging from about 34% and about 42% by weight, N-(n-butyl)thiophosphoric triamide is present in said composition in an amount between about 0.02% and about 0.3% by weight, and dicyandiamide is present in said composition in an amount between about 0.03% and about 1.5% by weight.

21. A method as claimed in claim 19 wherein the weight ratio of N-(n-butyl)thiophosphoric triamide to dicyandiamide in said composition is above about 0.01.

22. A method as claimed in claim 19 wherein the weight ratio of N-(n-butyl)thiophosphoric triamide to dicyandiamide in said composition is between about 0.02 and about 8.0.

23. A method as claimed in claim 19 wherein the weight ratio of N-(n-butyl)thiophosphoric triamide to dicyandiamide in said composition is between about 0.1 and about 1.0.

* * * * *

UNITED STATES PATENT AND TRADEMARK OFFICE
CERTIFICATE OF CORRECTION

PATENT NO.   : 5,364,438

DATED        : November 15, 1994

INVENTOR(S)  : Weston et al

It is certified that error appears in the above-identified patent and that said Letters Patent is hereby corrected as shown below:

On the title page, item [75] Inventors: After "Gretna, Louisiana" insert --and Allen Ray Sutton, Corydon, Kentucky--

Signed and Sealed this

Seventh Day of March, 1995

*Attest:*

BRUCE LEHMAN

*Attesting Officer*   *Commissioner of Patents and Trademarks*